UNITED STATES PATENT OFFICE.

GEORGE F. DALTON, JR., OF CLEVELAND, OHIO.

BLACKBOARD COMPOSITION.

No. 877,554. Specification of Letters Patent. Patented Jan. 28, 1908.

Application filed April 22, 1907. Serial No. 369,569.

*To all whom it may concern:*

Be it known that I, GEORGE F. DALTON, Jr., a citizen of the United States, residing at Cleveland, in the county of Cuyahoga and State of Ohio, have invented a certain new and useful Improvement in Blackboard Composition, of which the following is a full, clear, and exact description.

The object of the present invention is to provide an improved compound for the manufacture of blackboards for use in schools and other situations where it may be desirable to have blackboards.

As is well known to those skilled in the art, the expense of the slate blackboards, now in common use, is large, and it is very expensive and difficult to handle these large blocks of slate. In fact, the expense and difficulties attendant upon the installation of these slate boards is such that in the majority of schools the officials have been forced to use ordinary plaster blackboards which are painted or given a superficial coating of black. These plaster boards are very poor substitutes for the slate, since they crack, swell or wrinkle within a short while, and are easily disfigured by the use of pointers, erasers and other hard objects; but they further must be frequently repainted and have not a surface which properly abrades the chalk used in writing.

My composition, in substantially the proportions below given, makes a blackboard which may be used in place of the ordinary plaster boards and the slate boards, with all of the advantages of each and without the disadvantages of either. I use, preferably, hydraulic cement to the amount of 4/15 of the entire mass, marble dust 8/15, coloring matter, such as lamp black, 3/15. The hydraulic cement may be varied from 3/15 to 6/15 of the entire mass. The marble dust is then correspondingly varied from 9/15 to 6/15, while the coloring matter remains substantially 3/15 of the mass.

The hydraulic cement is given body by the marble dust which has the double function of giving body and cohesiveness to the composition and of furnishing that surface commonly known in the art as a "feather edge" which properly abrades the chalk in such manner as to cause it to write efficiently. I find that part of the marble dust may be replaced by iron ore with very satisfactory results as the iron ore seems to improve the so-called "feather edge", and further, to give the composition a hardness and an ability to withstand the blows of hard articles, such as pointers and erasers, which is very marked and, of course, quite valuable.

The proportions of the composition, when iron ore is added, remains substantially as above outlined, with the exception that the iron ore replaces a fraction of the marble dust, replacing about 1/8 to 1/7 of that particular material.

This composition is simpler than any known in the art for making an effective blackboard and is very satisfactory in actual use.

Having thus described my invention, I claim:

1. The herein described composition of matter of hydraulic cement, marble dust and coloring matter.

2. The herein described composition of matter of hydraulic cement in proportion of from substantially 3/15 to 6/15 of the entire mass, marble dust correspondingly in proportion from 9/15 to 6/15, and coloring matter substantially 3/15 of the mass.

3. The herein described composition of matter of hydraulic cement, marble dust, iron ore and coloring matter.

4. The herein described composition of matter of hydraulic cement in proportion of from substantially 3/15 to 6/15 of the entire mass, marble dust correspondingly in proportion of substantially 8/15 to 5/15, iron ore substantially 1/15 and coloring matter substantially 3/15 of the mass.

In testimony whereof, I hereunto affix my signature in the presence of two witnesses.

GEORGE F. DALTON, JR.

Witnesses:
J. M. WOODWARD,
E. B. GILCHRIST.